(12) United States Patent
Kobayashi et al.

(10) Patent No.: US 6,756,709 B2
(45) Date of Patent: Jun. 29, 2004

(54) STATOR STRUCTURE OF VARIABLE RELUCTANCE RESOLVER

(75) Inventors: Masahiro Kobayashi, Omori-nishi (JP); Taiichi Miya, Omori-nishi (JP); Naofumi Kumagai, Omori-nishi (JP)

(73) Assignee: Minebea Co., Ltd., Kitasaku-gun (JP)

( * ) Notice: Subject to any disclaimer, the term of this patent is extended or adjusted under 35 U.S.C. 154(b) by 38 days.

(21) Appl. No.: 10/260,309

(22) Filed: Oct. 1, 2002

(65) Prior Publication Data

US 2003/0030349 A1 Feb. 13, 2003

Related U.S. Application Data

(63) Continuation of application No. 09/991,718, filed on Nov. 26, 2001, now abandoned.

(30) Foreign Application Priority Data

Nov. 29, 2000 (JP) ........................................ 2000-362938

(51) Int. Cl.[7] .............................. H02K 1/04; H02K 1/12
(52) U.S. Cl. ........................... 310/43; 310/71; 310/254; 310/218; 310/45
(58) Field of Search ........................................... 310/43

(56) References Cited

U.S. PATENT DOCUMENTS

| | | | | |
|---|---|---|---|---|
| 3,194,993 A | | 7/1965 | Hackney et al. ............... 310/43 |
| 3,434,087 A | * | 3/1969 | Hoffman ...................... 336/96 |
| 3,861,026 A | * | 1/1975 | Swaim ........................ 310/43 |
| 4,340,829 A | * | 7/1982 | McCoy ........................ 310/71 |
| 4,881,001 A | | 11/1989 | Patel et al. .................. 310/258 |
| 5,508,578 A | | 4/1996 | Suzuki et al. ................ 310/254 |
| 5,723,931 A | | 3/1998 | Andrey ........................ 310/179 |
| 6,020,661 A | * | 2/2000 | Trago et al. ................... 310/43 |

FOREIGN PATENT DOCUMENTS

| | | | |
|---|---|---|---|
| JP | A 61-218335 | 9/1986 | |
| JP | A 4-364336 | 12/1992 | |
| JP | A 5-146106 | 6/1993 | |
| JP | 05146106 A * | 6/1993 | ............ H02K/3/52 |
| JP | A 10-322944 | 12/1998 | |
| JP | A 11-341729 | 12/1999 | |
| JP | A 2001-324352 | 11/2001 | |
| JP | 2001-324353 | 11/2001 | |

* cited by examiner

Primary Examiner—Burton S. Mullins
Assistant Examiner—J. Aguirrechea
(74) Attorney, Agent, or Firm—Oliff & Berridge, PLC (57) ABSTRACT

A stator assembly is formed by sandwiching a circular stator core made of soft magnetic plates from the both sides with a first magnetic-pole assembly having a part mounting section and a second magnetic-pole assembly. The stator core, the first magnetic-pole assembly, and the second magnetic-pole assembly are surrounded by a synthetic resin in a manner such that a surface at which a magnetic-pole tooth of the stator core face a rotor is exposed. The part mounting section has a plurality of holes in each of which a pin (not shown) penetrates, and holes also penetrating in the stator core at positions corresponding to the outside of the circumference of the first magnetic-pole assembly. The first magnetic-pole assembly and the part mounting section, and the second magnetic-pole assembly are fitted with the synthetic resin surrounding through the plurality of through holes provided for the stator core.

5 Claims, 9 Drawing Sheets

STATOR STRUCTURE OF VARIABLE RELUCTANCE RESOLVER

This is a Continuation of Application No. 09/991,718 filed Nov. 26, 2001 now abandoned. The entire disclosure of the prior application is hereby incorporated by reference herein in its entirety.

BACKGROUND OF THE INVENTION

1. Field of the Invention

The present invention relates to a stator structure of a variable reluctance resolver, and more particularly concerns a stator structure of a variable reluctance resolver having excellent waterproofing, oil-proofing, vibration resisting and shock resisting features.

2. Description of the Related Art

In a resolver for various uses such as detection of rotating position, there is provided a variable reluctance resolver having a plurality of magnetic poles projecting from a circular yoke member, and a rotor in a stator in which stator windings are wound around the magnetic poles.

In the stator magnetic pole of the variable reluctance resolver, a plurality of circular yoke members formed by stamping out a soft iron plate with a press die are laminated to form a stator core. In the structure of the stator, stator windings wound around a plurality of magnetic poles of the stator core are subjected to potting, on which a protective cover is fixed with an adhesive, or a stator is vertically sandwiched with a cover mechanically. In addition as another structure, a member made of an insulator (stator magnetic-pole assembly) for winding a coil around the stator core is disposed in a manner so as to surround magnetic-pole teeth of the stator core. In order to ensure insulation between the winding coil and the stator magnetic-pole assembly covering the stator magnetic poles, an insulator made of an insulating material such as a resin is separately formed, and which is inserted in the coil winding sections of the stator magnetic-pole assembly. Alternatively, an insulating coating is directly sprayed onto the stator magnetic-pole assembly or chemical treatment is applied to form a thin insulating film over the entire surface without inside surface of the poles.

However, in the structure in which the protective cover is fixed with the adhesive, it may be disengaged due to change in temperature, vibration, or shock. In addition, since a claw section of the protective cover made of the insulating material such as the resin is inserted in a slot section in which the coil of the stator magnetic-pole assembly is wound, a coating of the coil is damaged to cause an insulation failure of the coil thereby deteriorating reliability of the variable reluctance resolver. Although such protection structure is effective for a mechanical damage, it is difficult to resist severe environment such as water proof, vibration, and shock.

Furthermore, in assembling a small variable reluctance resolver, there is no space for pressurizing and fastening the entire circular yoke member with eyelet, the yoke member being stamped out with the press die, and no pressure-fastening force is applied to a tip peripheral rim of the fixed magnetic-pole tooth. Therefore, problems occur in that a gap is formed between the laminated yoke members of the stator of the variable reluctance resolver so assembled so that rust generates at the inner portion of the laminated bodies during operation for a long period, and also when the stator is magnetized or the rotor is rotated, the laminated bodies are vibrated to generate a noise.

In order to solve the above problems, for example, a method of Japanese Unexamined Patent Application Publication No. 10-322944 is disclosed, in which a synthetic resin layer is formed on a surface of the stator magnetic-pole assembly, and surrounds with the stator, and subsequently the windings are wound in order to solve the problems. However, problems remain in waterproofing, oil proofing, vibration resisting, and shock resisting.

SUMMARY OF THE INVENTION

Accordingly, it is an object of the present invention to provide a stator structure of a variable reluctance resolver having excellent water proofing, oil proofing, vibration resisting, and impact resisting features.

In order to achieve the above objects, in a stator structure of a variable reluctance resolver according to the present invention, comprises: a stator core having a torus shape, in which a plurality of fixed magnetic-poles each having a fixed magnetic-pole tooth project toward the center of a circular yoke member, and a plurality of planar bodies are laminated; a first stator magnetic-pole assembly including coil winding sections having the same shape and number as the fixed magnetic poles each having the fixed magnetic-pole tooth of the stator core, and a part mounting section for extracting stator windings; and a second stator magnetic-pole assembly including coil winding sections having the same shape and number as the fixed magnetic poles each having the fixed magnetic-pole tooth of the stator core, and including no part mounting section, wherein the stator core is sandwiched by the first stator magnetic-pole assembly and the second stator magnetic-pole assembly from the both sides in a manner such that the fixed magnetic poles and the coil winding sections overlap to form a stator assembly; and wherein the stator assembly having the stator windings wound around the coil winding sections thereof is surrounded by a synthetic resin, wherein the synthetic resin surrounds the first stator magnetic-pole assembly and the second stator magnetic-pole assembly at the stator winding sections in a manner such that a surface at which the fixed magnetic-pole teeth of the stator core face a rotor is exposed, and a surface of the synthetic resin forms the same circumferential surface as the surface at which the fixed magnetic-pole teeth face the rotor.

In the stator structure of the variable reluctance resolver, preferably, the first stator magnetic-pole assembly and the second stator magnetic-pole assembly include uneven sections for increasing a creeping distance at a contact section relative to the synthetic resin.

In the stator structure of the variable reluctance resolver, preferably, the uneven section for increasing the creeping distance is provided at the surface that comes into contact with the synthetic resin on overhung section for retaining the stator winding wound around the coil winding section of the stator assembly.

In the stator structure of the variable reluctance resolver, preferably, the circular stator core has a plurality of through holes along the outermost periphery of the surrounding synthetic resin.

In the stator structure of the variable reluctance resolver, preferably, the part mounting section provided for the first stator magnetic-pole assembly, and the circular stator core have a plurality of through holes, respectively, and the through holes are arranged at positions where the through holes of the part mounting sections correspond to those of the circular stator core.

In the stator structure of the variable reluctance resolver, preferably, the synthetic resin, the first stator magnetic-pole assembly, and the second stator magnetic-pole assembly have almost the same thermal expansion coefficient.

DESCRIPTION OF THE PREFERRED EMBODIMENTS

Figure 1:
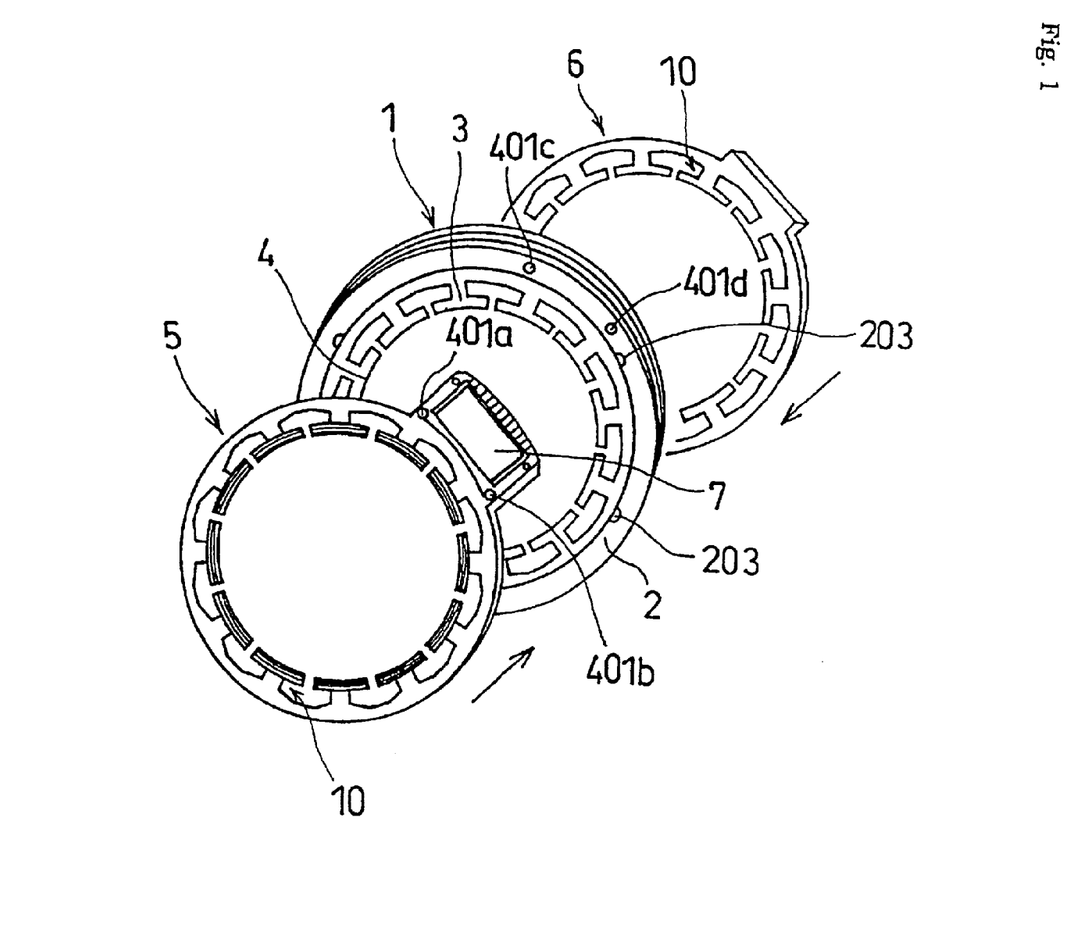
FIG. 1 is an exploded view of a stator structure of a resolver according to the present invention.

An embodiment of the present invention will be hereinafter described in detail with reference to the drawings. FIG. 1 is an exploded view of a stator structure of a resolver according to the present invention. In the drawing, a circular stator core 1 is made of a soft magnetic iron plate such as a silicon-steel sheet similarly to the conventional art. The stator core 1 includes a circular yoke section 2, a plurality of fixed magnetic pole sections 3 projecting toward the center from the yoke section 2, and fixed magnetic pole teeth 4 each provided at a tip thereof. The plurality of stator cores 1 are laminated.

A plurality of stator-magnetic-pole-assembly fixing holes 203 provided at the stator core 1 penetrates in the laminated stator cores 1. A synthetic resin 201 penetrates in the stator-magnetic-pole-assembly fixing holes 203 to fix a first stator magnetic-pole assembly 5 and a second stator magnetic-pole assembly 6 to the stator core 1 by surrounding them in such a manner that will be described later. The synthetic resin 201 is made of a material having a thermal expansion coefficient of 0.00003 cm/cm/° C. such as a PBT glass (30%).

The first stator magnetic-pole assembly 5 and the second stator magnetic-pole assembly 6 are made of, for example, the material having a thermal expansion coefficient of 0.00003 cm/cm/° C. such as a PBT glass (30%), and include coil winding sections 10 having the same shape and the number as the fixed magnetic-pole section and the magnetic-pole tooth of the yoke member. The first stator magnetic-pole assembly 5 has a part mounting section 7, and the second stator magnetic-pole assembly 6 has not the part mounting section 7. The stator is assembled in a manner such that the laminated stator cores 1 are sandwiched from the both sides by the first stator magnetic-pole assembly 5 and the second stator magnetic-pole assembly 6, and fixed magnetic-pole teeth 4 provided for fixed magnetic-pole sections 3 of the stator core 1 and the coil winding sections 10 of the first stator magnetic-pole assembly 5 and the second stator magnetic-pole assembly 6 are overlapped respectively.

Two part-mounting-section fixing holes 401c and 401d provided for the stator core 1 penetrate in the stator cores 1 so deposited. By surrounding the first stator magnetic-pole assembly 5 and the second stator magnetic-pole assembly 6 with the synthetic resin 201 in such a manner that will be described later, the synthetic resin 201 penetrates in through holes 401a and 401b provided at the part mounting section 7 to form the entire stator so that the part mounting section 7 is fixed to the stator core 1.

A stator winding (not shown) is wound around each of the coil winding sections 10 of the stator assembled as described above by a predetermined method, and ends of the winding are connected to the part mounting section 7, and are fixed to the first stator magnetic-pole assembly 5 and the second stator magnetic-pole assembly 6. Subsequently, the stator is surrounded by the synthetic resin 201 in such a manner that will be described later. An exposed part of the part mounting section 7 is sealed with a potting agent (indicated by numeral 70 in FIG. 2) that is a material having a thermal expansion coefficient of 0.000046 cm/cm/° C. such as an epoxy resin.

Figure 2:
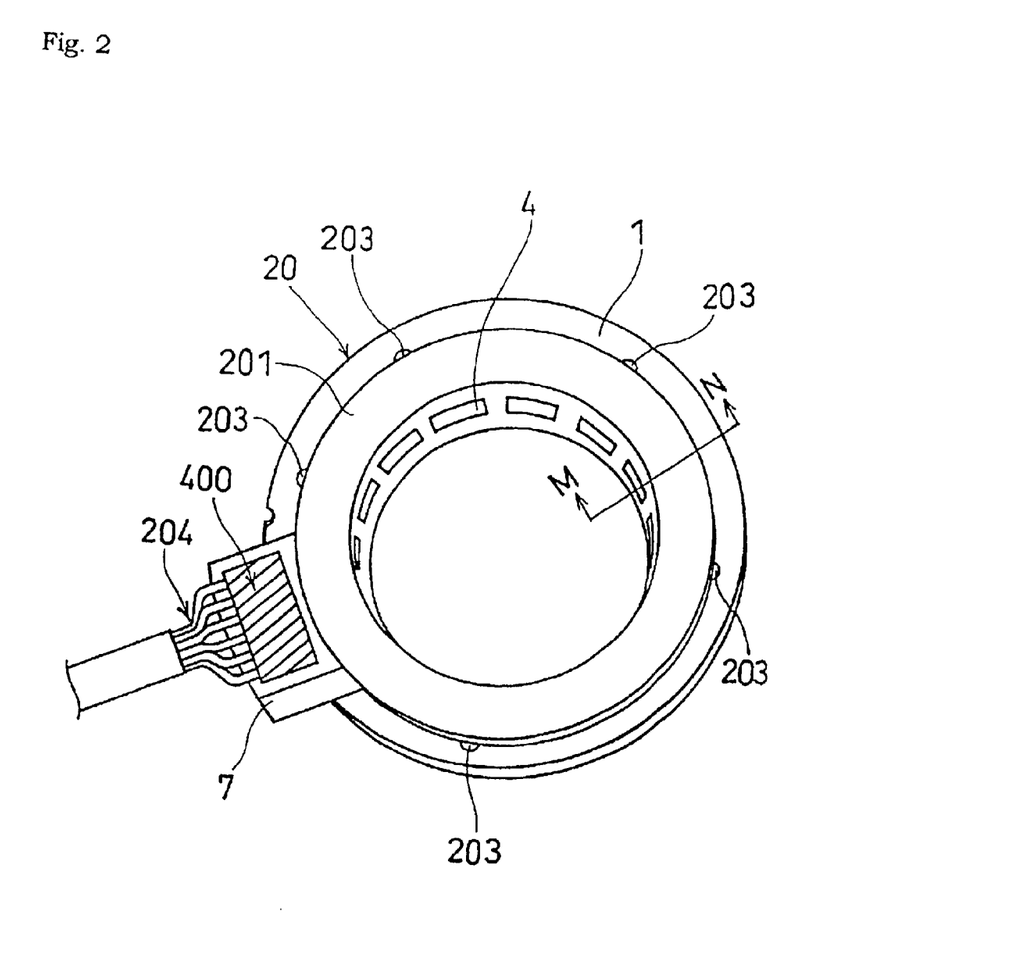
FIG. 2 is a schematic view of a stator assembly according to the present invention.

FIG. 2 is a schematic view of a stator assembly 20 in which the stator of the variable reluctance resolver, which is formed as described above, is surrounded by the synthetic resin. The stator assembly 20 is formed by sandwiching the circular stator core 1 made of the soft magnetic plates from the both sides by the first stator magnetic-pole assembly having the part mounting section 7 and the second stator magnetic-pole assembly.

In FIG. 2, the stator core 1 and the first stator magnetic-pole assembly 5 and the second stator magnetic-pole assembly 6 that sandwich both ends of the stator core 1 are surrounded by the synthetic resin 201 in a manner such that surfaces of the magnetic-pole teeth 4 of the stator core 1, which face the rotor, are exposed. The first stator magnetic-pole assembly 5 and the second stator magnetic-pole assembly 6 are connected with the synthetic resin 201 surrounding them while penetrating in the plurality of through holes 203 provided for the stator core 1.

Tip portions of the fixed magnetic-pole teeth 4 of the stator core 1 face an outer surface of the rotor (not shown) provided at an inner side of the stator assembly 20. The synthetic resin 201 forms the same circumference surface as the tip portions of the fixed magnetic-pole teeth 4 and the tip portions are not covered with the synthetic resin 201.

In addition, the synthetic resin 201 comes between the windings of the stator assembly 20, in which the stator windings are wound to fix the stator magnetic-pole assembly in such a manner that will be described later.

The interior of the part mounting section 7 is not covered with the synthetic resin 201, into which the potting agent is injected to seal the exposed part thereof as described above.

Wire rods 204 are extracted from the part mounting section 7, into which the potting agent is injected, and can be connected to the outside.

There are provided the plurality of stator-magnetic-pole-assembly fixing holes 203 (only one is shown), which penetrate in the stator core 1 and the stator magnetic-pole assembly (not shown), and the synthetic resin 201 surrounds the stator core 1 and the stator magnetic-pole assembly (not shown).

Figures 3A, 3B:
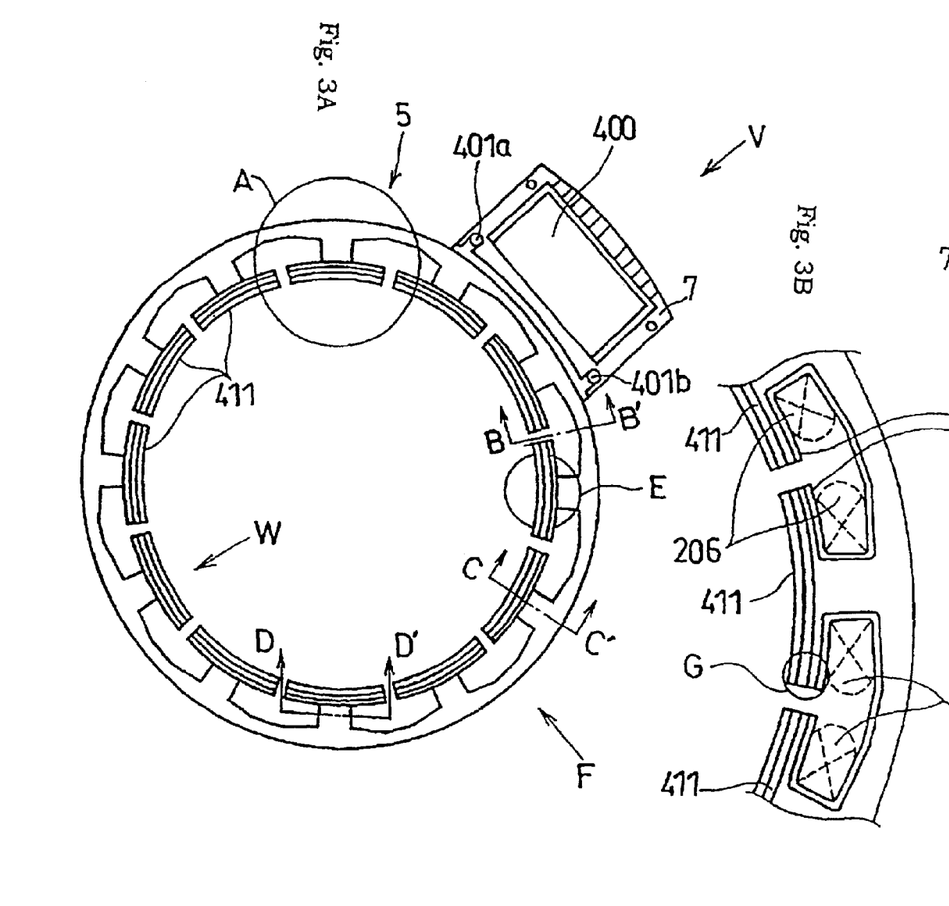
FIG. 3A is a front detail view of a first stator magnetic-pole assembly according to the present invention.
FIG. 3B is an enlarged view of A section in FIG. 3A.
Figure 3C:
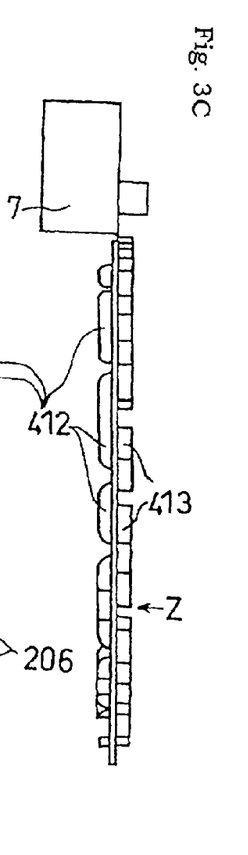
FIG. 3C is a side view seen from F direction in FIG. 3A.

FIG. 3A is a front detail view of the first stator magnetic-pole assembly 5; FIG. 3B is an enlarged view of A section in FIG. 3A; and FIG. 3C is a side view of the assembly 5 seen from F direction in FIG. 3A. In FIG. 3C, a surface on the Z side is a rear, for sandwiching the stator core 1.

The through holes 401a and 401b penetrate in the part mounting section 7, at positions corresponding to the outside of the circumference of the first stator magnetic-pole assembly 5. The through holes 401a and 401b also penetrate in the deposited stator core 1. By surrounding the first stator magnetic-pole assembly 5, the stator core 1, and the second stator magnetic-pole assembly 6 with the synthetic resin 201, the synthetic resin 201 comes in the through holes 401a and 401b to fix the part mounting section 7 from the both sides of the stator core 1.

The first stator magnetic-pole assembly 5 includes uneven portions 411 for increasing a creeping distance. The uneven portions 411 for increasing the creeping distance are provided at a surface that comes into contact with the synthetic resin 201 surrounding stator windings 206 of overhung sections 412 for retaining the stator windings 206 wound in the stator assembly 20, that is, the front side of the first stator magnetic-pole assembly 5.

Figure 4A:
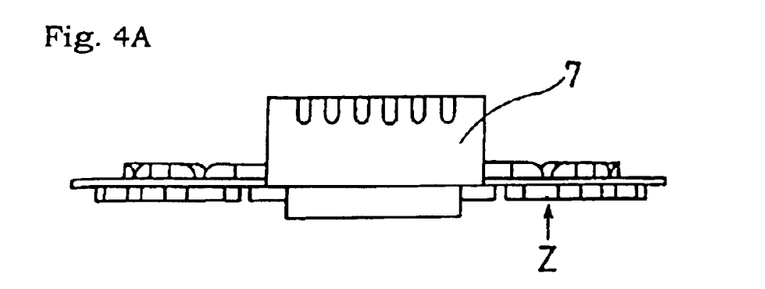
FIG. 4A is an enlarged view of a part mounting section 7 of the first stator magnetic-pole assembly according to the present invention, which is seen from V direction in FIG. 3A.
Figure 4B:
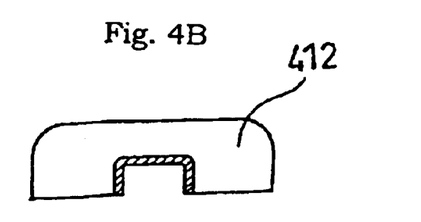
FIG. 4B is an enlarged view of an overhung section seen from D–D' direction in FIG. 3A.
Figure 4C:
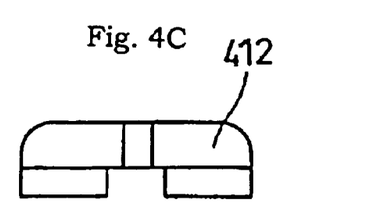
FIG. 4C is an enlarged view of the overhung section seen from W direction in FIG. 3A.
Figure 4D:
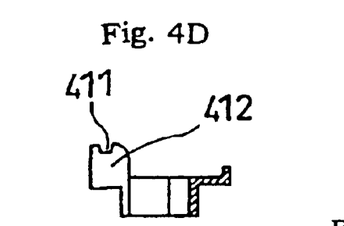
FIG. 4D is an enlarged view of the overhung section seen from B–B' direction in FIG. 3A.
Figure 4E:
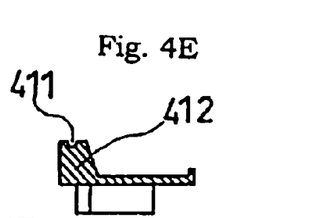
FIG. 4E is a view of the overhung section seen from C–C' direction in FIG. 3A and an enlarged view of G section in FIG. 3B.

FIGS. 4A to 4E are enlarged views of parts of the first stator magnetic-pole assembly 5. FIG. 4a is a view of the part mounting section 7 seen from V direction in FIG. 3A; FIG. 4B is a view of the overhung section 412 seen from D–D' direction in FIG. 3A; FIG. 4C is a view of the overhung section 412 seen from W direction in FIG. 3A; FIG. 4D is a view of the overhung section 412 seen from B–B' direction in FIG. 3A; and FIG. 4E is a view of the overhung section 412 seen from C–C' direction in FIG. 3A and an enlarged view of G section in FIG. 3B.

A gap in microns possibly generates at the contact surfaces of the first stator magnetic-pole assembly 5 and the second stator magnetic-pole assembly 6 with the synthetic resin 201 because they are made of different materials even if surrounded by the synthetic resin 201. Water or the like permeates into the gap to generate rust in the laminated stator cores 1 during operation for a long time. In order to prevent the permeation of water, the overhung sections 412 provide the uneven portions 411 for increasing the creeping distance.

Figure 4F:
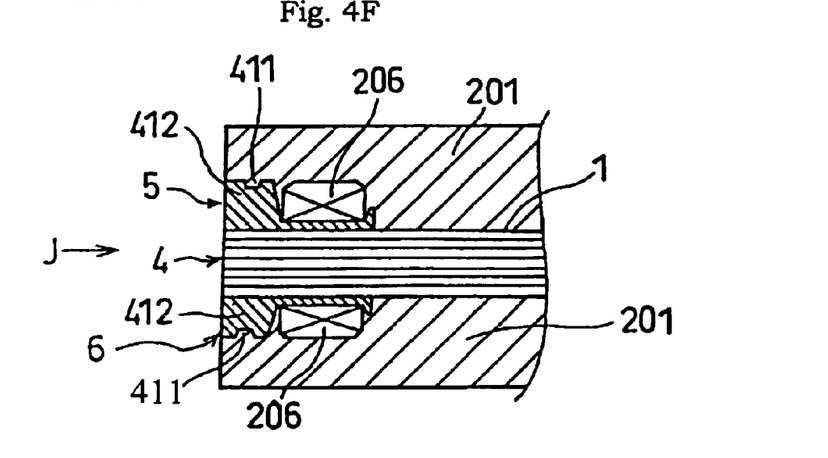
FIG. 4F is a cross-sectional view taken on line M–N in FIG. 2.

FIG. 4F is a cross-sectional view taken on line M–N in FIG. 2. As shown in FIG. 4F, the uneven portions 411 are provided on the contact surface side of the synthetic resin 201 surrounding the stator windings 206 of the overhung sections 412 for retaining the stator winding 206 wound in the stator assembly 20.

In FIG. 4F, the stator windings 206 are wound around the coil winding sections 10 of the stator assembly 20 in which the stator core 1 is sandwiched from the both sides by the first stator magnetic-pole assembly 5 and the second stator magnetic-pole assembly 6, and which are surrounded from the both sides by the synthetic resin 201. The fixed magnetic-pole teeth 4, the first stator magnetic-pole assembly 5, and the second stator magnetic-pole assembly 6 form the same circumference surface, facing a direction J of the rotor (not shown), and the fixed magnetic-pole teeth 4 are exposed.

Figure 5:
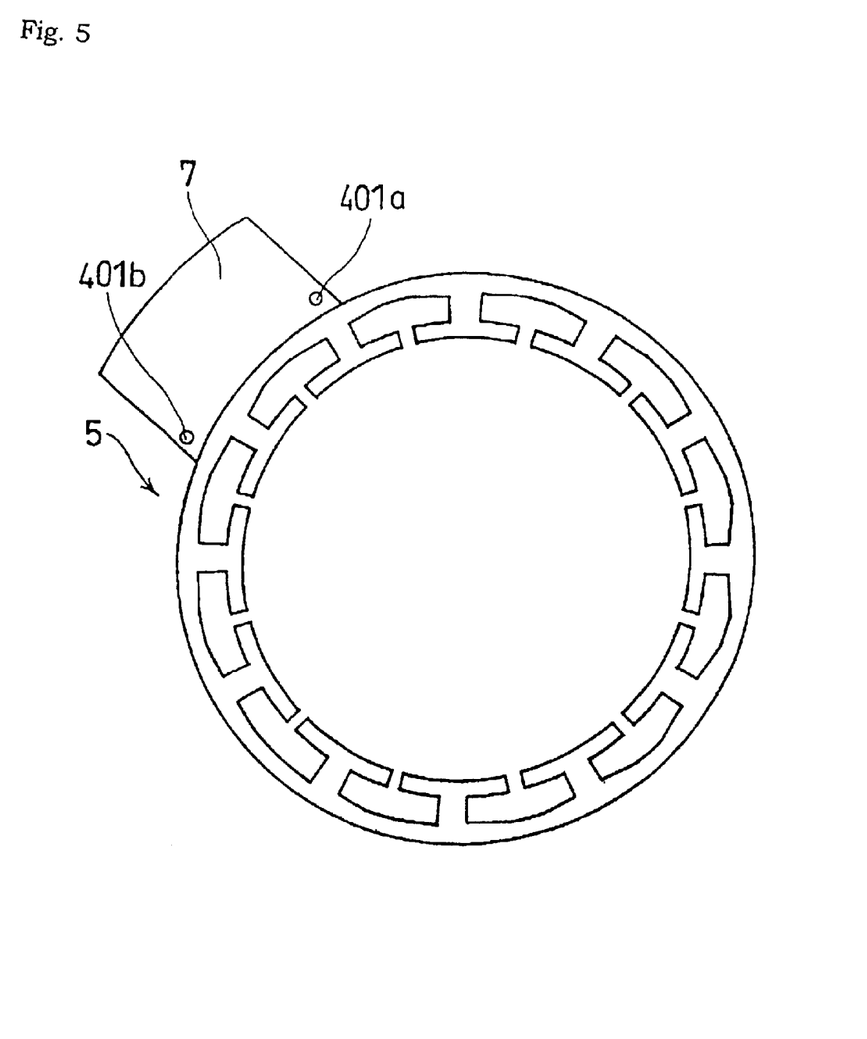
FIG. 5 is a rear detail view of the first stator magnetic-pole assembly according to the present invention.

FIG. 5 is a rear detail view of the first stator magnetic-pole assembly 5, in which the through holes 401a and 401b penetrate. The rear surface of the first stator magnetic-pole assembly 5 has not the uneven portions 411, on which the stator core 1 is provided in a manner so as to be sandwiched with the second stator magnetic-pole assembly 6, as shown in FIG. 4F.

Figure 6:
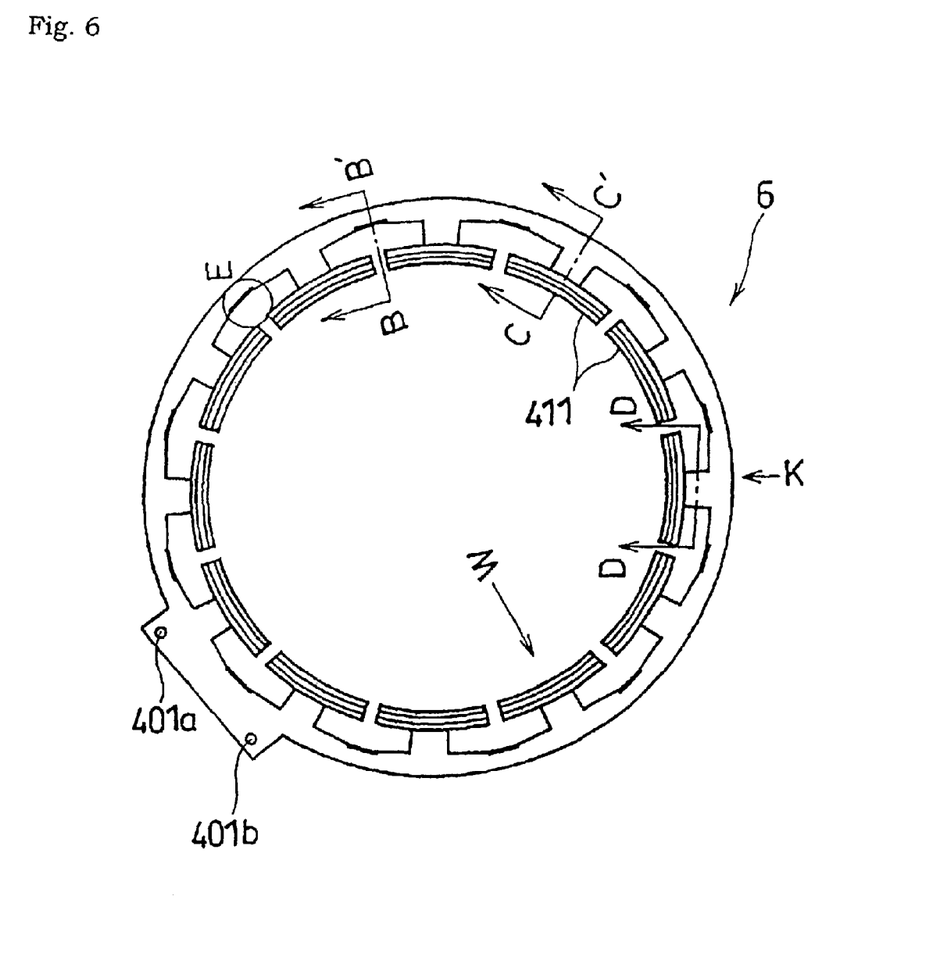
FIG. 6 is a front detail view of a second stator magnetic-pole assembly 6 according to the present invention.

FIG. 6 is a front detail view of the second stator magnetic-pole assembly 6. It has the same structure as the first stator magnetic-pole assembly 5 shown in FIGS. 3A to 3C, except parts shown in FIGS. 7D and 7E, and except for having no part mounting section 7.

Figure 7A:
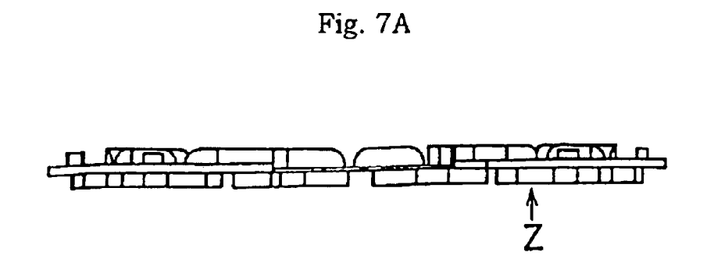
FIG. 7A is a view seen from K direction in FIG. 6.
Figure 7B:
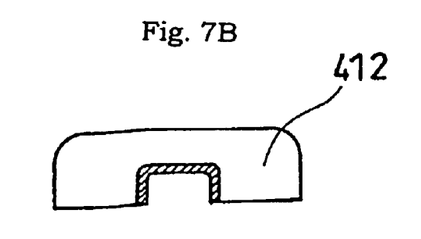
FIG. 7B is a view of the overhung section seen from D–D' direction in FIG. 6.
Figure 7C:
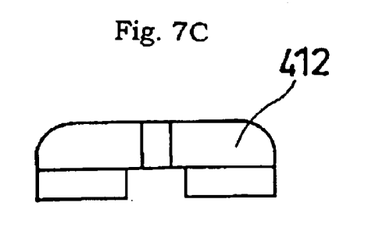
FIG. 7C is a view of the overhung section seen from W direction in FIG. 6.
Figure 7D:
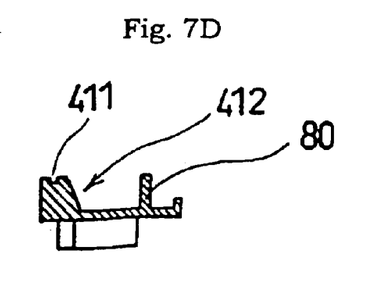
FIG. 7D is a view of the overhung section seen from C–C' direction in FIG. 6.
Figure 7E:
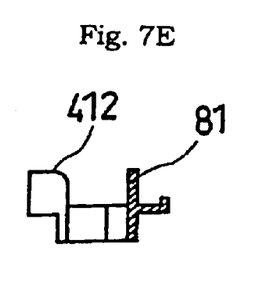
FIG. 7E is a view of the overhung section seen from B–B' direction in FIG. 6.

FIG. 7A is a view seen from K direction in FIG. 6. In the drawing, a plane Z is a plane that comes into contact with the stator 1. FIG. 7B is a view of the overhung section 412 seen from D–D' direction in FIG. 6. FIG. 7C is a view of the overhung section 412 seen from W direction in FIG. 6. FIG. 7 D is a view of the overhung section 412 seen from C–C' direction in FIG. 6. And, FIG. 7 E is a view of the overhung section 412 seen from B–B' direction in FIG. 6. FIGS. 7D and 7E show the same parts in FIGS. 4E and 4D, respectively. In FIGS. 7D and 7E, overhung sections 80 and 81 are provided so that the stator windings 206 are not disengaged from the overhung sections 412 of the second stator magnetic-pole assembly 6.

Figure 8:
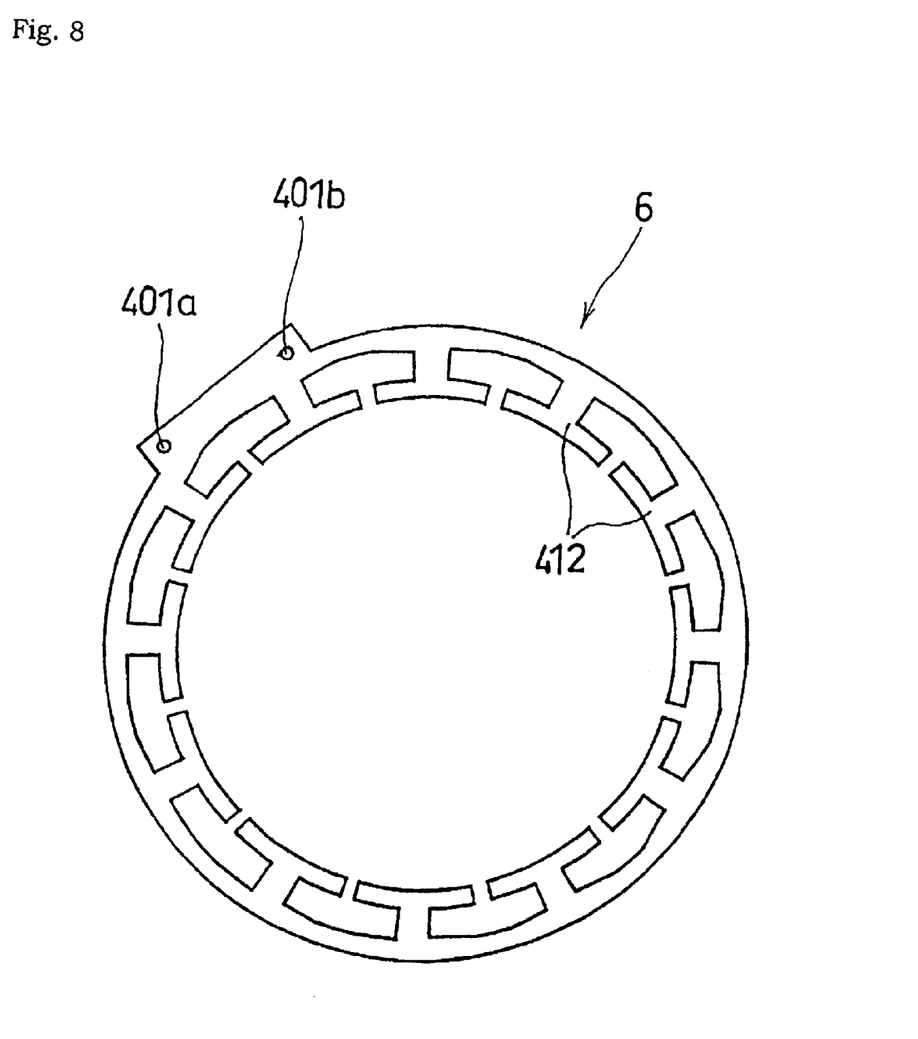
FIG. 8 is a rear detail view of the second stator magnetic-pole assembly according to the present invention.

FIG. 8 is a rear detail view of the second stator magnetic-pole assembly 6, in which the through holes 401a and 401b penetrate. The overhung sections 412 at the rear of the second stator magnetic-pole assembly 6 have not the uneven portions 411, on which the stator core 1 is provided in a manner so as to be sandwiched with the second stator magnetic-pole assembly 6, as shown in FIG. 4F.

Figure 9:
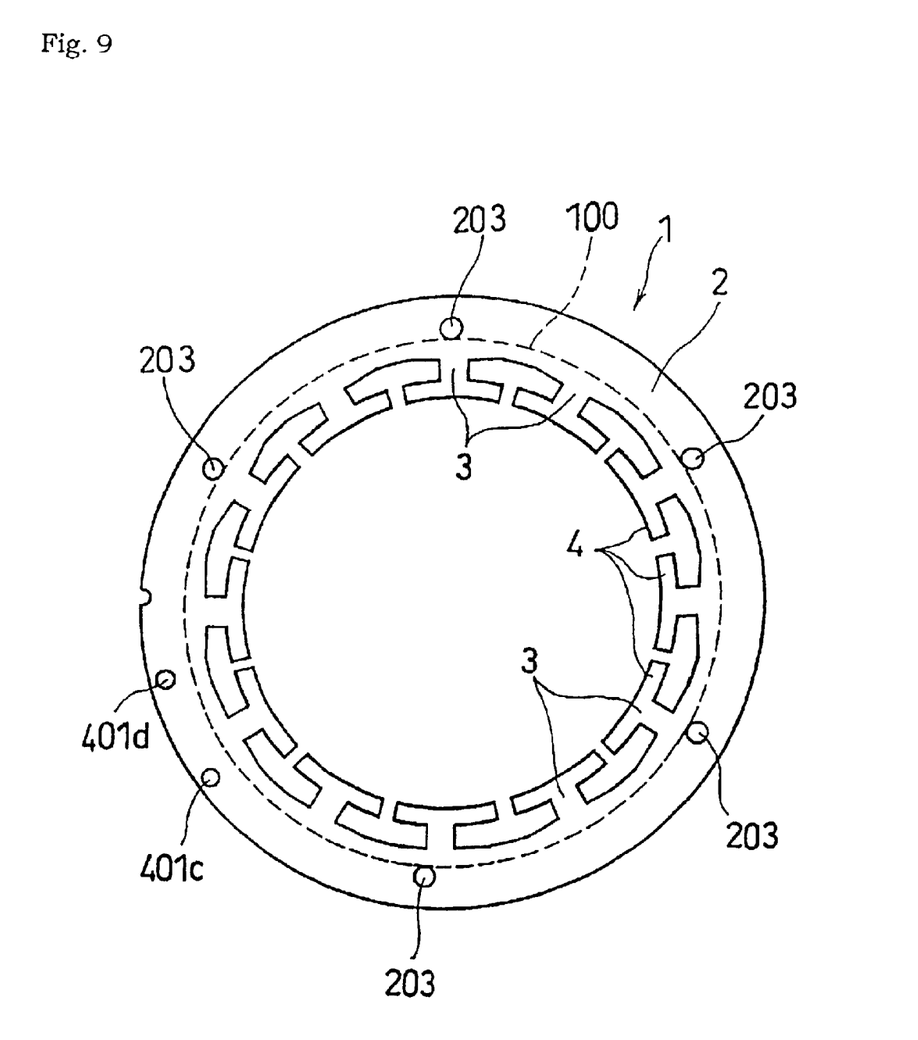
FIG. 9 is a view of the stator core 1 according to the present invention.

FIG. 9 is a view of the stator core 1, which includes the circular yoke section 2, the plurality of fixed magnetic pole sections 3 projecting inwardly therefrom radially, and the fixed magnetic pole sections each provided at the tip thereof, and the plurality of stator cores 1 are laminated.

The plurality of stator-magnetic-pole-assembly fixing holes 203 penetrate in the circular yoke section 2. The plurality of through holes 203 are arranged along an outermost periphery 100 (shown in broken line in FIG. 10) of the surrounding synthetic resin 201. The first stator magnetic-pole assembly 5 and the second stator magnetic-pole assembly 6 are at the inside of the outermost periphery of the synthetic resin 201 and are surrounded by the synthetic resin 201.

The two part-mounting-section fixing holes 401c and 401d are arranged at positions corresponding to the through holes 401a and 401b of the part mounting section 7, and penetrate in the laminated stator cores 1.

In order to surround the stator assembly 20 formed by sandwiching the stator cores 1 with the first stator magnetic-pole assembly 5 and the second stator magnetic-pole assembly 6, a molding die (not shown) is formed, to which the synthetic resin 201 is injected from an inlet of molding die, and is cooled under pressure. In this case, no pressurizing and fastening force is applied to the stator cores 1 relative to the first stator magnetic-pole assembly 5 and the second stator magnetic-pole assembly 6, so that a gap generates at the stator of the variably reluctance resolver so assembled. In order to solve the above problems, the stator cores 1 have the plurality of stator-magnetic-pole-assembly fixing holes 203, which penetrate in the laminated stator cores 1.

The stator magnetic-pole teeth 4 of the stator cores 1 are deposited between the first stator magnetic-pole assembly 5 and the second stator magnetic-pole assembly 6, and the stator assembly 20 is surrounded by the synthetic resin 201 as shown in FIG. 2. In this instance, the synthetic resin 201 penetrates between the coils 206 of the stator assembly 20, fixes the first stator magnetic-pole assembly 5 and the second stator magnetic-pole assembly 6, and fixes the stator magnetic-pole teeth 4 of the stator cores 1 from the both sides. Furthermore, the synthetic resin 201 penetrating in the through holes 203 of the stator cores 1 from the outermost periphery of the first stator magnetic-pole assembly 5 and the second stator magnetic-pole assembly 6 fixes the first stator magnetic-pole assembly 5 and the second stator magnetic-pole assembly 6 by sandwiching the stator cores 1 from both sides thereof. Accordingly, even if a stress is applied so that the outermost periphery of the first stator magnetic-pole assembly 5 and the second stator magnetic-pole assembly 6 deflect due to change in temperature, the first stator magnetic-pole assembly 5 and the second stator magnetic-pole assembly 6 pull against each other to prevent deforming thereby preventing permeation of water. In addition, as described above, the synthetic resin 201, the first stator magnetic-pole assembly 5, and the second stator magnetic-pole assembly 6 are made of the material having the same thermal expansion coefficient of 0.00003 cm/cm/° C. such as a PBT glass (30%). Accordingly, it prevents generation of the gap between the synthetic resin 201 and the stator cores 1 arising from difference of thermal expansion coefficient due to change in temperature, and prevents the permeation of water.

The stator structure of the variable reluctance resolver according to the present invention comprises: the stator core having a circular shape, in which the plurality of fixed magnetic-poles each having the fixed magnetic-pole tooth project toward the center of the circular yoke member, and a plurality of planar bodies are laminated; the first stator magnetic-pole assembly including the coil winding sections having the same shape and number as the fixed magnetic poles each having the fixed magnetic-pole tooth of the stator core, and the part mounting section for extracting the stator windings; and the second stator magnetic-pole assembly including the coil winding sections having the same shape and number as the fixed magnetic poles each having the fixed magnetic-pole tooth of the stator core, and including no part mounting section, wherein the stator cores are sandwiched by the first stator magnetic-pole assembly and the second stator magnetic-pole assembly in a manner such that the fixed magnetic poles and the coil winding sections overlap to form a stator assembly; and wherein the stator assembly having the stator windings wound around the coil winding sections thereof is surrounded by the synthetic resin, wherein the synthetic resin surrounds the first stator magnetic-pole assembly and the second stator magnetic-pole assembly at the stator winding sections in a manner such that the surface at which the fixed magnetic-pole teeth of the stator core face the rotor is exposed, and the surface of the synthetic resin forms the same circumferential surface as the surface at which the fixed magnetic-pole teeth of the stator core face the rotor. Therefore, there is no need for a protective cover made of an insulating material such as a resin; consequently, problems such that a claw of the protective cover is inserted in a slot section round which the coil of the stator magnetic-pole assembly is wound to damage a coating of the coil, causing an insulation failure, can be solved.

In the stator structure of the variable reluctance resolver, the first stator magnetic-pole assembly and the second stator magnetic-pole assembly include the uneven sections for increasing the creeping distance at the contact section relative to the synthetic resin; consequently, permeation of water into the interior can be prevented.

In the stator structure of the variable reluctance resolver, the uneven section for increasing the creeping distance is provided at the surface that comes into contact with the synthetic resin on the overhung section for retaining the stator winding wound around the coil winding section of the stator assembly; consequently, the molding die for surrounding the synthetic resin can easily be manufactured.

In the stator structure of the variable reluctance resolver, the circular stator core has the plurality of through holes along the outermost periphery of the surrounding synthetic resin, and is sandwiched from the both sides; consequently, the drawback such that a gap is formed between the planar bodies of the stator core to generate rust in the planar bodies during operation for a long period can be eliminated, and problems such that when magnetizing the stator or rotating the rotor, the planar bodies are vibrated to generate a noise can be solved.

In the stator structure of the variable reluctance resolver, the part mounting section provided for the first stator magnetic-pole assembly, and the circular stator core have the plurality of through holes, respectively, and the through holes are arranged at the positions where the through holes of the part mounting sections correspond to those of the circular stator core; consequently, the part mounting section provided integrally with the stator magnetic-pole assembly can easily be mounted.

In the stator structure of the variable reluctance resolver, the synthetic resin, the first stator magnetic-pole assembly, and the second stator magnetic-pole assembly have almost the same thermal expansion coefficient; consequently, the troubles such that a gap is formed between the synthetic resin and the stator core because of the difference of a thermal expansion coefficient due to the change in temperature so that water or the like permeates can be prevented.

What is claimed is:

1. A stator structure of a variable reluctance resolver comprising:

a stator core having a circular shape, in which a plurality of fixed magnetic-poles each having a fixed magnetic-pole tooth project toward the center of a circular yoke member, and a plurality of planar bodies are laminated;

a first stator magnetic-pole assembly including coil winding sections having the same shape and number as the fixed magnetic poles each having the fixed magnetic-pole teeth of the stator core, and a part mounting section for extracting stator windings; and a second stator magnetic-pole assembly including coil winding sections having the same shape and number as the fixed magnetic poles each having the fixed magnetic-pole tooth of the stator core, and including no part mounting section, wherein the stator cores are sandwiched by the first stator magnetic-pole assembly and the second stator magnetic-pole assembly in a manner such that the fixed magnetic poles and the coil winding sections overlap to form a stator assembly; and wherein the stator assembly having the stator windings wound around the coil winding sections thereof is surrounded by a synthetic resin, characterized in that: said synthetic resin surrounds said first stator magnetic-pole assembly and said second stator magnetic-pole assembly at said stator winding sections in a manner such that a surface at which said fixed magnetic-pole teeth of said stator core face a rotor is exposed, and a surface of said synthetic resin forms the same circumferential surface as the surface at which said fixed magnetic-pole teeth of said stator core face said rotor, wherein said first stator magnetic-pole assembly and said second stator magnetic-pole assembly include uneven sections to provide an increased contact surface at a contact section for sealing with said synthetic resin.

2. The stator structure of a variable reluctance resolver according to claim 1, wherein said synthetic resin, said first stator magnetic-pole assembly, and said second stator magnetic-pole assembly have almost the same thermal expansion coefficient.

3. A stator structure of a variable reluctance resolver comprising:

a stator core having a circular shape, in which a plurality of fixed magnetic-poles each having a fixed magnetic-pole tooth project toward the center of a circular yoke member, and a plurality of planar bodies are laminated;

a first stator magnetic-pole assembly including coil winding sections having the same shape and number as the fixed magnetic poles each having the fixed magnetic-pole teeth of the stator core, and a part mounting section for extracting stator windings; and a second stator magnetic-pole assembly including coil winding sections having the same shape and number as the fixed magnetic poles each having the fixed magnetic-pole tooth of the stator core, and including no part mounting section, wherein the stator cores are sandwiched by the first stator magnetic-pole assembly and the second stator magnetic-pole assembly in a manner such that the fixed magnetic poles and the coil winding sections overlap to form a stator assembly; and wherein the stator assembly having the stator windings wound around the coil winding sections thereof is surrounded by a synthetic resin, characterized in that:
said synthetic resin surrounds said first stator magnetic-pole assembly and said second stator magnetic-pole assembly at said stator winding sections in a manner such that a surface at which said fixed magnetic-pole teeth of said stator core face a rotor is exposed, and a surface of said synthetic resin forms the same circumferential surface as the surface at which said fixed magnetic-pole teeth of said stator core face said rotor, wherein an uneven section which increases the surface that comes into contact with said synthetic resin is provided on overhung section for retaining said stator winding wound around said coil winding section of said stator assembly.

4. The stature structure of a variable reluctance resolver according to claim 3, wherein said synthetic resin, said first stator magnetic-pole assembly, and said second stator magnetic-pole assembly have almost the same thermal expansion coefficient.

5. A stator structure of a variable reluctance resolver comprising:

a stator core having a circular shape, in which a plurality of fixed magnetic-poles each having a fixed magnetic-pole tooth project toward the center of a circular yoke member, and a plurality of planar bodies are laminated;

a first stator magnetic-pole assembly including coil winding sections having the same shape and number as the fixed magnetic poles each having the fixed magnetic-pole teeth of the stator core, and a part mounting section for extracting stator windings; and a second stator magnetic-pole assembly including coil winding sections having the same shape and number as the fixed magnetic poles each having the fixed magnetic-pole tooth of the stator core, and including no part mounting section, wherein the stator cores are sandwiched by the first stator magnetic-pole assembly and the second stator magnetic-pole assembly in a manner such that the fixed magnetic poles and the coil winding sections overlap to form a stator assembly; and wherein the stator assembly having the stator windings wound around the coil winding sections thereof is surrounded by a synthetic resin, characterized in that:
said synthetic resin surrounds said first stator magnetic-pole assembly and said second stator magnetic-pole assembly at said stator winding sections in a manner such that a surface at which said fixed magnetic-pole teeth of said stator core face a rotor is exposed, and a surface of said synthetic resin forms the same circumferential surface as the surface at which said fixed magnetic-pole teeth of said stator core face said rotor, wherein said synthetic resin, said first stator magnetic-pole assembly, and said second stator magnetic-pole assembly have almost the same thermal expansion coefficient.

* * * * *